(12) United States Patent
Luan et al.

(10) Patent No.: US 9,472,182 B2
(45) Date of Patent: Oct. 18, 2016

(54) VOICE FONT SPEAKER AND PROSODY INTERPOLATION

(71) Applicant: Microsoft Technology Licensing, LLC, Redmond, WA (US)

(72) Inventors: Jian Luan, Beijing (CN); Lei He, Beijing (CN); Max Leung, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/190,875

(22) Filed: Feb. 26, 2014

(65) Prior Publication Data

US 2015/0243275 A1 Aug. 27, 2015

(51) Int. Cl.
*G10L 13/02* (2013.01)
*G10L 13/08* (2013.01)
*G10L 13/033* (2013.01)

(52) U.S. Cl.
CPC ............ *G10L 13/02* (2013.01); *G10L 13/033* (2013.01); *G10L 13/08* (2013.01)

(58) Field of Classification Search
CPC ....... G10L 13/02; G10L 15/26; G10L 13/08; G10L 2021/0135
USPC ................. 704/260, 235, 208, 214
See application file for complete search history.

(56) References Cited

U.S. PATENT DOCUMENTS

| | | | |
|---|---|---|---|
| 5,796,916 A | 8/1998 | Meredith | |
| 5,905,972 A | 5/1999 | Huang et al. | |
| 6,253,182 B1 | 6/2001 | Acero | |
| 6,810,378 B2 | 10/2004 | Kochanski et al. | |
| 6,950,799 B2 | 9/2005 | Bi et al. | |
| 7,454,348 B1 | 11/2008 | Kapilow et al. | |
| 7,693,719 B2 | 4/2010 | Chu et al. | |
| 7,831,420 B2 | 11/2010 | Sinder et al. | |

(Continued)

FOREIGN PATENT DOCUMENTS

| | | |
|---|---|---|
| EP | 2639791 A1 | 9/2013 |
| JP | EP 2639791 A1 * 9/2013 | ............. G10L 15/26 |

OTHER PUBLICATIONS

"International Search Report and Written Opinion Issued in PCT Patent Application No. PCT/US2015/017002", Mailed Date: Jun. 9, 2015, 12 Pages.

Hsu, et al., "Speaker-Dependent Model Interpolation for Statistical Emotional Speech Synthesis", In EURASIP Journal on Audio, Speech, and Music Processing, vol. 2012, Issue 21, Aug. 16, 2012, 10 Pages.

(Continued)

*Primary Examiner* — Thierry L Pham
(74) *Attorney, Agent, or Firm* — Merchant & Gould, P.C.

(57) ABSTRACT

Multi-voice font interpolation is provided. A multi-voice font interpolation engine allows the production of computer generated speech with a wide variety of speaker characteristics and/or prosody by interpolating speaker characteristics and prosody from existing fonts. Using prediction models from multiple voice fonts, the multi-voice font interpolation engine predicts values for the parameters that influence speaker characteristics and/or prosody for the phoneme sequence obtained from the text to spoken. For each parameter, additional parameter values are generated by a weighted interpolation from the predicted values. Modifying an existing voice font with the interpolated parameters changes the style and/or emotion of the speech while retaining the base sound qualities of the original voice. The multi-voice font interpolation engine allows the speaker characteristics and/or prosody to be transplanted from one voice font to another or entirely new speaker characteristics and/or prosody to be generated for an existing voice font.

20 Claims, 9 Drawing Sheets

(56) References Cited

U.S. PATENT DOCUMENTS

| | | |
|---|---|---|
| 8,285,549 B2 | 10/2012 | Teegan et al. |
| 8,332,225 B2 | 12/2012 | Zhao et al. |
| 2002/0049594 A1 | 4/2002 | Moore et al. |
| 2005/0096909 A1 | 5/2005 | Bakis et al. |
| 2010/0153108 A1 | 6/2010 | Szalai et al. |
| 2010/0153116 A1 | 6/2010 | Szalai et al. |
| 2014/0052447 A1 | 2/2014 | Tachibana et al. |

OTHER PUBLICATIONS

"Second Written Opinion Issued in PCT Application No. PCT/US2015/017002", Mailed Date: Jan. 27, 2016, 5 Pages.

International Preliminary Report on Patentability Issued in PCT Application No. PCT/US2015/017002, Mailed Date: Jun. 3, 2016, 8 Pages.

* cited by examiner

VOICE FONT SPEAKER AND PROSODY INTERPOLATION

BACKGROUND

Conventional text-to-speech (TTS) techniques use a single voice font. This voice font is trained with a recording corpus obtained from one voice talent. The resulting voice font strongly corresponds to the prosody and characteristics used by the voice talent when recording the corpus. Accordingly, when being recorded, the voice talent must use the same style and emotion that is desired in the TTS voice.

As the use of TTS becomes more prevalent, the flexibility of the TTS voice becomes increasingly important in various application scenarios. For example, an interactive application utilizing TTS to communicate with the user should provide the user with the ability to select from multiple voice personalities that are able to express rich emotion types and speaking styles. As TTS applications become more conversational and personal, the ability of the TTS application to adapt the speech style and/or the emotion of the speech of a single voice to match the conversational content is also desirable.

To get recordings covering a variety of emotions and styles for even a single voice is costly. Obtaining the desirable variety of recordings for multiple voices is not only costly, but impracticable. Attempts to transplant an emotion or speaking style from one recording/voice font to other voice fonts using conventional voice adaptation techniques have resulted in poor quality voice fonts that fail to convey the desired emotion and/or style and has highlighted the close relationship between the original recording and the emotion and/or style used by the voice talent. It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of a multi-voice font interpolation engine include a text parser, one or more characteristic predictors, one or more characteristic interpolators, and a normalizer. The multi-voice font interpolation engine loads, or otherwise receives, multiple voice fonts from the voice font repository into memory. A text parser parses the text to be spoken into a phoneme sequence that, when combined with a voice font, produces computer-generated speech with the sound, style, and emotion specified by the voice font and provides other information useful for predicting natural acoustic features. The characteristic predictors for natural acoustic features, such as a duration predictor, a V/UV predictor, a fundamental frequency (f0) predictor, and a spectrum predictor use the corresponding parameter prediction models to predict the characteristic values for each of the source voice fonts. The characteristic interpolators, such as a duration interpolator, a V/UV interpolator, a fundamental frequency (f0) interpolator, and a spectrum interpolator, employ different weight sets for interpolating characteristics of the multi-voice font from the selected characteristics of each source voice font.

The interpolation method performed by the multi-voice font interpolation engine predicts characteristic values for components of the input text (e.g., each phoneme or frame in the phoneme sequence) using the characteristic prediction model supplied by each source voice font. Next, a relative weighting factor for one or more characteristics are assigned to each the source voice fonts contributing to the multi-voice font. In various embodiments, the sum of each set of weighting factors is set to one. The multi-voice font interpolation engine interpolates the final duration of each input text component by summing the weighted predicted characteristic values from the source voice fonts and normalizes the interpolated f0 values for the phoneme sequence. The interpolated duration values, the interpolated spectral trajectory values, the interpolated V/UV decisions, and the normalized interpolated F0 values may be used in a speech synthesis operation that generates a signal usable by an audio output transducer to produce speech using the resulting multi-voice font having the selected speaker and/or prosody characteristics and/or saved as a multi-voice font for later use.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a multi-voice font interpolation engine are described herein and illustrated in the accompanying figures. The multi-voice font interpolation engine allows the production of computer generated speech with a wide variety of speaker characteristics and/or prosody by interpolating speaker characteristics and prosody from existing fonts. Using the prediction models from multiple voice fonts, the multi-voice font interpolation engine predicts values for the parameters that influence speaker characteristics and/or prosody for the phoneme sequence obtained from the text to spoken. For each parameter, additional parameter values are generated by a weighted interpolation from the predicted values. Modifying an existing voice font with the interpolated parameters changes the style and/or emotion of the speech while retaining the base sound qualities of the original voice. The multi-voice font interpolation engine allows the speaker characteristics and/or prosody to be transplanted from one voice font to another or entirely new speaker characteristics and/or prosody to be generated for an existing voice font.

Figure 1:
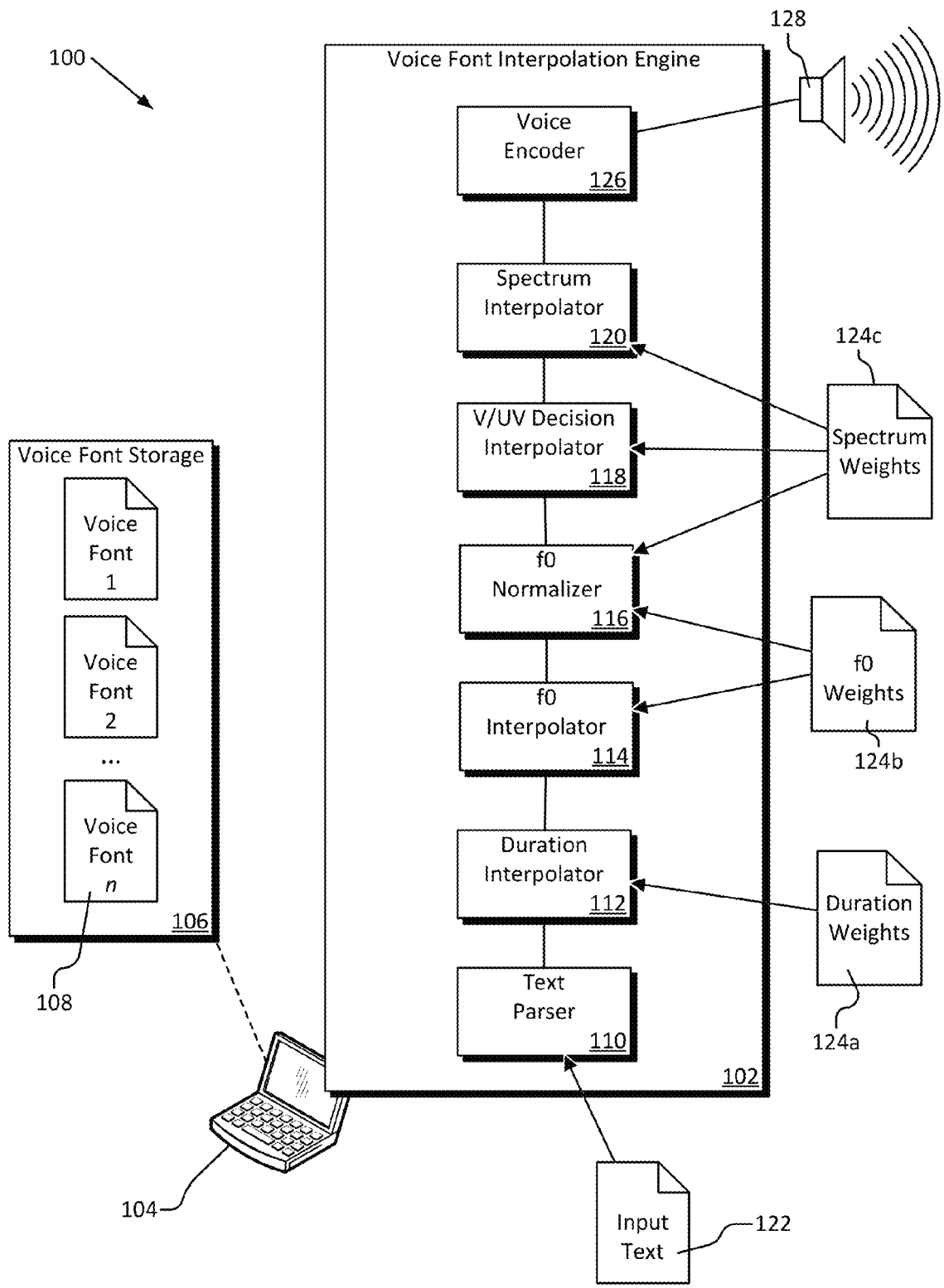
FIG. 1 is a system diagram of one embodiment of a voice font interpolation system implemented in a suitable computing environment.

FIG. 1 is a system diagram of one embodiment of a voice font interpolation system implemented in a suitable computing environment. The voice font interpolation system 100 includes a multi-voice font interpolation engine 102 running on a client device 104. The multi-voice font interpolation engine is a computer program for generating interpolated voice fonts having the desired speaker characteristics and prosody. The multi-voice font interpolation engine may be implemented in various forms, such as applications, services, and libraries. For example, the multi-voice font interpolation engine may be implemented as a stand-alone application. In other embodiments, the multi-voice font interpolation engine may be implemented as a support application accessible through an application programming interface (API) or a library or module to provide voice font interpolation to other programs rendering a text-to-speech (TTS) output.

A voice font storage 106 holds a number of existing voice fonts 108. The voice font storage may be local storage (e.g., a hard drive or other secondary storage on the client device) or remote storage (e.g., a storage device accessible over a network). The existing voice fonts are often, but are not limited to, original voice fonts trained from a recording corpus collected from a voice talent. Each existing voice font has a number of associated parameters that define the sound, style, and emotion of the voice used to render the computer-generated speech. Generally, a voice font includes prediction models for the duration, fundamental frequency (f0), the spectral envelope, and the voiced/unvoiced (V/UV) decision. Duration contributes mostly to the rhythm of the voice. The f0 contour contributes to the tone of the voice. The spectral envelope, the f0 range, and the voiced/unvoiced decision are more relevant to the speaker characteristics and prosody. In other words, the spectral envelope, the f0 range, and the voiced/unvoiced parameter primarily control the style and emotion of the speech produced using the voice font. The existing voice fonts represent diverse emotions and speaking styles.

The multi-voice font interpolation engine includes a text parser 110, a duration interpolator 112, an f0 interpolator 114, a normalizer 116, a V/UV decision interpolator 118, and a spectrum interpolator 120. The multi-voice font interpolation engine loads, or otherwise receives, multiple voice fonts from the voice font repository into memory. The text parser parses the input text 122 to be spoken into a phoneme sequence that, when combined with a voice font, produces computer-generated speech with the sound, style, and emotion specified by the voice font. In various embodiments, the text parser performs additional functions, such as, but not limited to, identifying parts of speech, phase segmentation, and semantic components in the input text. The additional information provided by the text parser is useful for predicting natural acoustic features, such as, but not limited to, duration, V/UV, f0, and spectrum characteristics.

The duration interpolator, the V/UV interpolator, the f0 interpolator, and the spectrum interpolator use the corresponding parameter prediction models to predict the values for each of the loaded voice fonts. The multi-voice font interpolation engine employs different weight sets for interpolating the four characteristics. In various embodiments, three weight sets are used. The first weight set 124a is associated with duration (i.e., the duration weights). The second weight set 124b is associated with f0 (i.e., the f0 weights). Each weight set includes a weighting factor for each of the voice fonts used by the multi-voice font interpolation engine. The third weight set 124c is associated with the spectrum (i.e., the spectrum weights) and, also, the V/UV decision because the V/UV decision is closely tied (i.e., directly proportional) to the spectral trajectory and independently varying the values tends to significantly reduce voice quality. For each increment of the input text, the interpolated value is the sum of the products of the predicted values and the associated weighting factor for the voice font and summed to produce an interpolated parameter value. Adjusting the weight given to each voice font influencing the interpolated values alters the speaker characteristics and/or prosody of the computer-generated speech.

The normalizer normalizes the interpolated f0 values using interpolated upper and lower limits for the f0 range of the predicted f0 values and the interpolated f0 values. In the illustrated embodiment, the multi-voice font interpolation engine includes a voice encoder (i.e., vocoder) 126 that renders the input text as speech using the interpolated values. In various embodiments, the computer-generated speech is played through the audio output transducer (i.e., speaker) 128 of the client device.

Together, the voice fonts and the weight sets that produce the computer-generated speech having the interpolated speaker characteristics and/or prosody defines a multi-voice font. Generally, source voice fonts most closely resembling the desired speaker characteristic and/or prosody are selected and the weights are tuned to approach the desired voice. In various embodiments, the multi-voice font interpolation engine saves the multi-voice font as a configuration file specifying the source voice fonts and the associated weighting factors in the three weight sets. In some embodiments, the configuration file may be part of a wrapper that includes the source voice fonts. In other embodiments, the source voice fonts are stored separately and loaded from references in the configuration file.

Figure 2A:
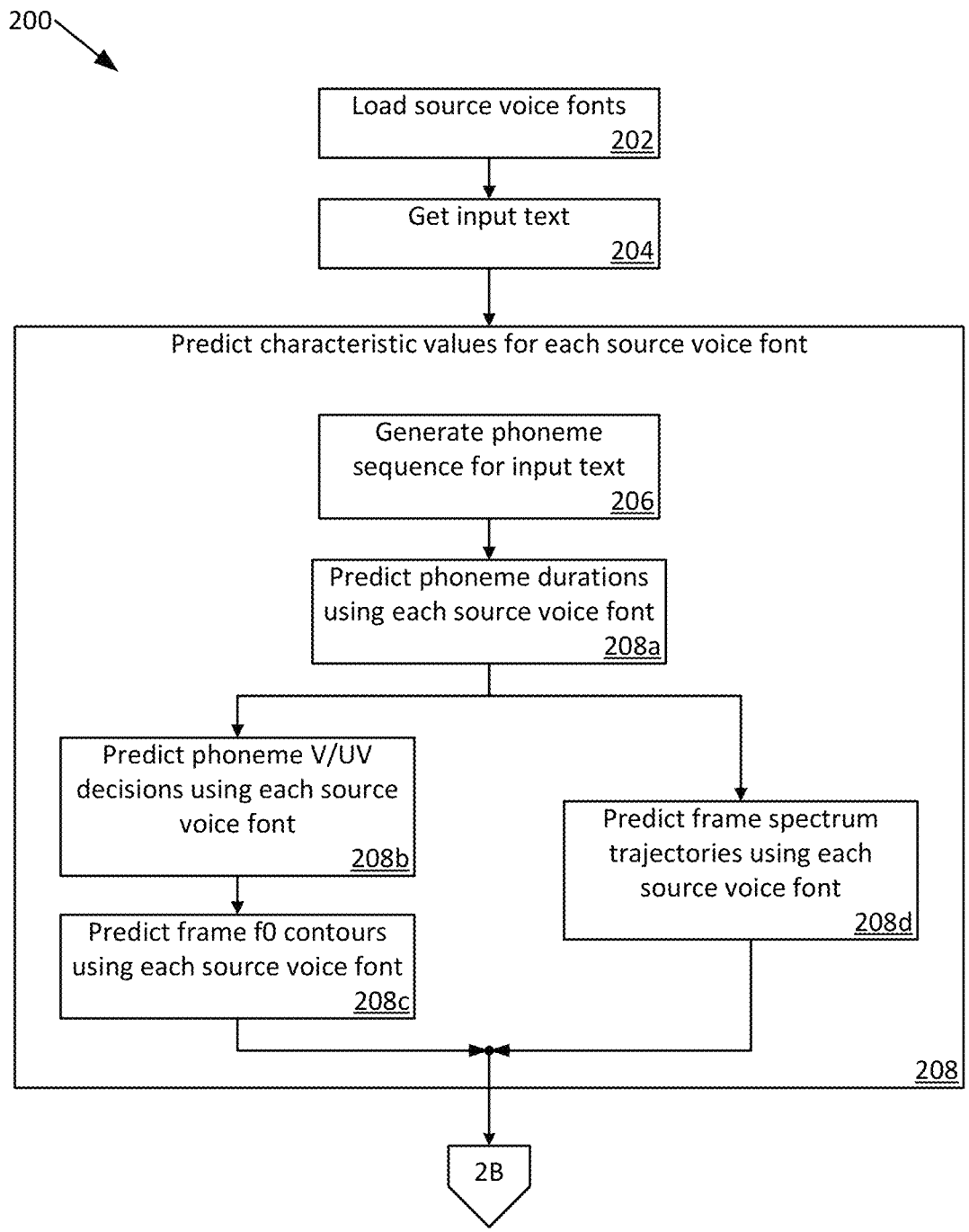
FIGS. 2A-2C collectively form a high-level flowchart of one embodiment of the interpolation method employed by the multi-voice font interpolation engine.
Figure 2B:
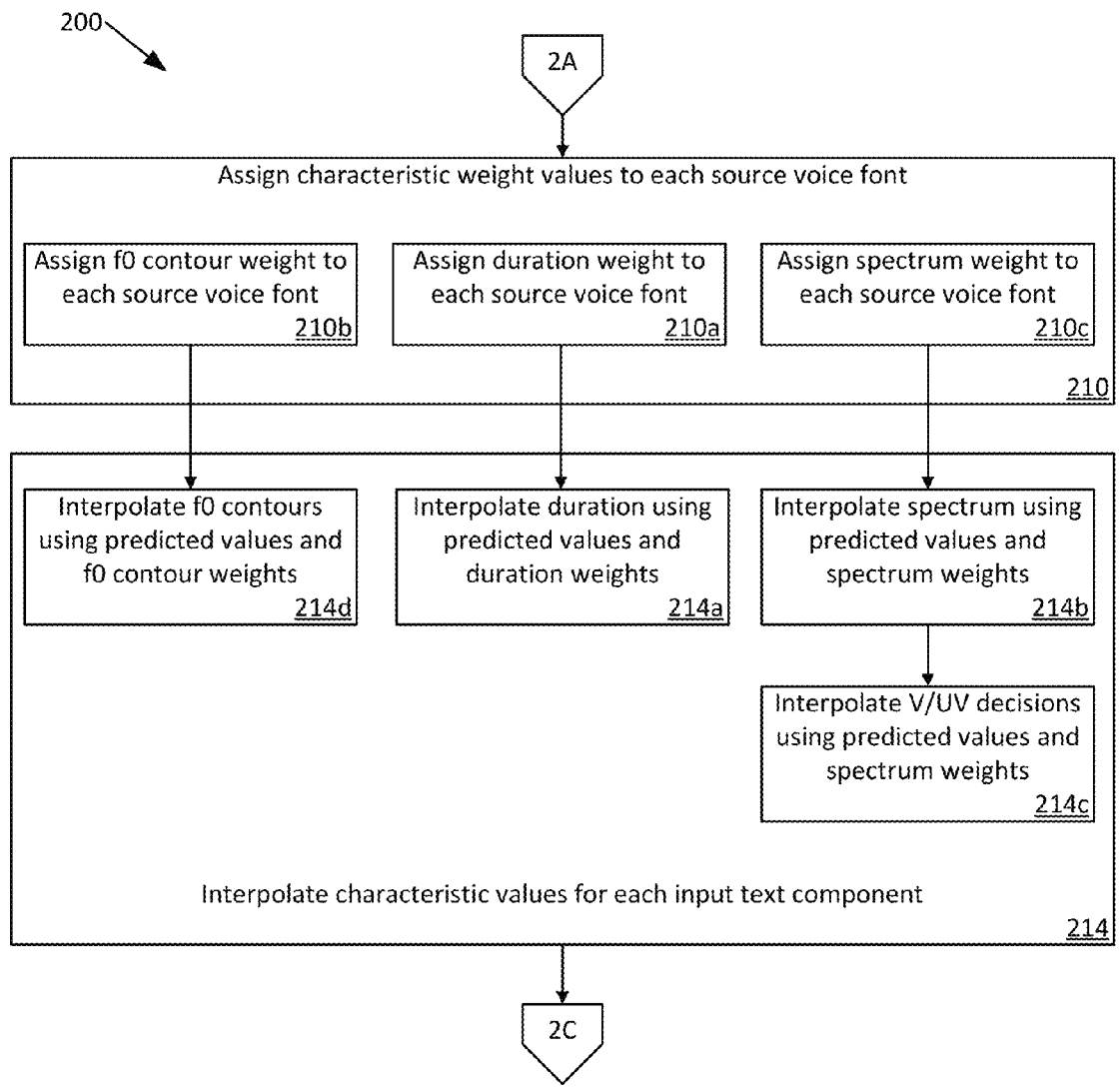
Figure 2C:
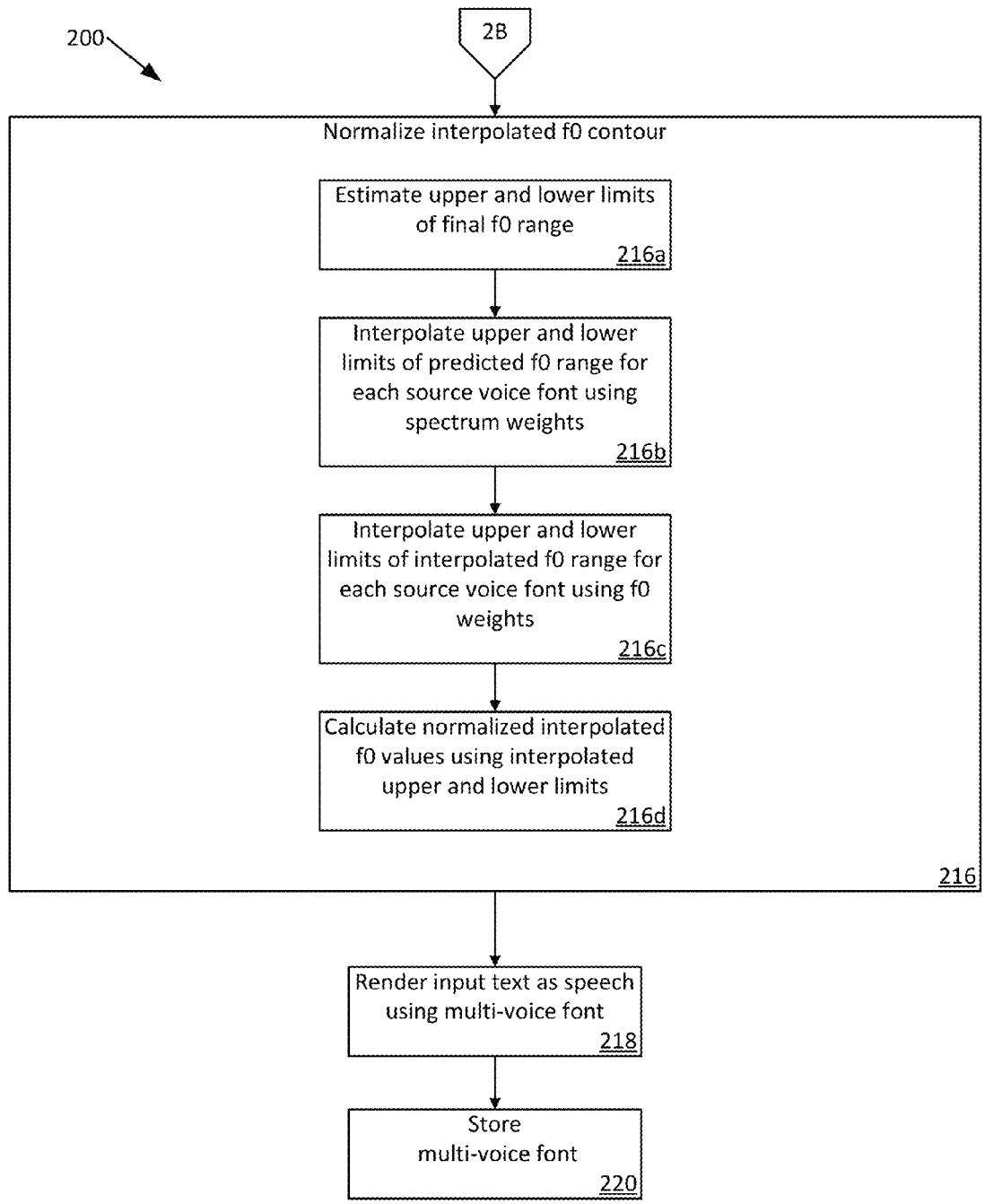

FIGS. 2A-2C collectively form a high-level flowchart of one embodiment of the interpolation method employed by the multi-voice font interpolation engine. The interpolation method 200 begins with a source voice font loading operation 202 that loads multiple source voice fonts into memory. The source voice fonts provide the reference parameters used from which a multi-voice font is interpolated. A text input operation 204 receives the text that is to be converted into speech. A text parsing operation 206 builds a phoneme sequence from the input text.

A voice font characteristic prediction operation 208 predicts characteristic values for components (i.e., linguistic units) of the input text (e.g., each phoneme or frame in the phoneme sequence) using the characteristic prediction model supplied by each source voice font. In various embodiments the voice font characteristic prediction operation 208 includes a duration prediction operation 208a, a V/UV decision prediction operation 208b, an f0 prediction operation 208c, and a spectrum prediction operation 208d. The duration prediction operation 208a predicts the duration value for each phoneme in the phoneme sequence using the duration prediction model supplied by each source voice font. The V/UV decision prediction operation 208b predicts the V/UV probability for each phoneme in the phoneme sequence using the V/UV decision prediction model supplied by each source voice font. It is not necessary to make the actual V/UV decision for the phonemes using each source voice font as the final V/UV decision will be made from the interpolated V/UV probability value for the phoneme. The f0 prediction operation 208c predicts the f0 value for each frame using the f0 prediction model supplied by each source voice font. Each frame represents a fixed length of time. The spectrum prediction operation 208d predicts the spectral trajectory value for each frame using the spectrum prediction model supplied by each source voice font. In the illustrated embodiment, some of the prediction operations are shown as occurring in parallel branches because the spectral trajectory prediction is not dependent on the V/UV decision or f0 predictions.

A characteristic weight setting operation 210 assigns a relative weighting factor for one or more characteristics to each of the source voice fonts contributing to the multi-voice font. In various embodiments, the characteristic weight setting operation 210 includes a duration weight setting operation 210a, an f0 weight setting operation 210b, and a spectrum weight setting operation 210c. The duration weight setting operation 210a assigns a relative duration weighting factor $w_j^d$ to each the source voice fonts contributing to the multi-voice font. The f0 weight setting operation 210b assigns the f0 weighting factor $w_j^f$ to each the source voice fonts contributing to the multi-voice font. The spectrum weight setting operation 210c assigns the relative spectrum weighting factor $w_j^s$ to each the source voice fonts contributing to the multi-voice font. In various embodiments, the sum of each set of weighting factors is set to one, as mathematically expressed in the following equations:

$$\sum_{j=1}^{N} w_j^d = 1 \quad (1)$$

$$\sum_{j=1}^{N} w_j^f = 1 \quad (2)$$

$$\sum_{j=1}^{N} w_j^s = 1 \quad (3)$$

where j is the index of the source voice font and N is the total number of source voice fonts.

The duration weighting factors $w_j^d$ and the f0 weighting factors $w_j^f$ primarily control the prosody of the multi-voice font while the spectrum weighting factors $w_j^s$ to primarily control the speaker characteristics. The duration, f0, and spectrum weighting factors may be independently controlled to achieve the desired style and/or emotion effect in the multi-voice font.

A characteristic interpolation operation 214 interpolates the final duration of each input text component by summing the weighted predicted characteristic values from the source voice fonts. In various embodiments, the characteristic interpolation operation 214 includes a duration interpolation operation 214a, a spectral trajectory interpolation operation 214b, a V/UV decision interpolation operation 214c, and an f0 interpolation operation 214d.

The duration interpolation operation 214a interpolates the final duration of each phoneme by summing the weighted predicted duration values from the source voice fonts. In other words, duration interpolation operation sums the product of the duration values predicted by each source voice font duration prediction model and the duration weighting factor assigned to the source voice font for each phoneme. Mathematically, the interpolated duration of the i-th phoneme from the input text is expressed as:

$$\text{dur}(i) = \sum_{j=1}^{N} w_j^d \text{dur}_j(i) \quad (4)$$

where j is the index of source voice font, N is the number of source voice fonts, $w_j^d$ is the duration weight for j-th voice font, and $\text{dur}_j(i)$ is the duration of i-th phoneme predicted by j-th duration prediction model.

The spectral trajectory interpolation operation 214b interpolates the final spectral trajectory of each frame of the phoneme sequence. In various embodiments, the spectral trajectory for each source voice font is predicted using the associated prediction models and then interpolated using the spectrum weighting factors. In other words, the spectral trajectory interpolation operation sums the product of the spectral trajectory values predicted by each source voice font spectral trajectory prediction model and the spectrum weighting factor assigned to the source voice font. Mathematically, the interpolated spectral trajectory of f-th frame from the input text is expressed as:

$$\text{spec}(f) = \sum_{j=1}^{N} w_j^s \text{spec}_j(f) \quad (5)$$

where j is the index of source voice font, N is the number of source voice fonts, $w_j^s$ is the spectrum weight for j-th voice font, and $\text{spec}_j(f)$ is the spectral trajectory of the f-th frame predicted by j-th f0 spectral trajectory prediction model. In other embodiments, the values of the underlying characteristic prediction models for each source voice font are interpolated first using the corresponding weighting factors to generate an interpolated spectrum prediction model that is used to calculate the interpolated spectral trajectory.

The V/UV decision interpolation operation 214c interpolates whether each phoneme is voiced or unvoiced by comparing the combined weighted predicted V/UV probability values from the source voice fonts to a threshold. In other words, the V/UV decision interpolation operation sums the product of the V/UV probability values predicted by each source voice font V/UV decision prediction model and the spectrum weighting factor assigned to the source voice font for each phoneme and compares the sum to a reference value (e.g., a threshold). If the sum is greater than or equal to the threshold, the phoneme is voiced in the multi-voice font. Otherwise, the phoneme is unvoiced in the multi-voice font. Although described as a threshold, alternate logic for making the V/UV decision may be used without departing from the scope and spirit of the invention. For example, the reference value may be treated as a ceiling with sums less than the ceiling indicating that the phoneme is voiced in the multi-voice font. Mathematically, the V/UV decision of i-th phoneme from the input text is expressed as:

$$uv(i) = \begin{cases} 1 & \text{if } \sum_{j=1}^{N} w_j^s uv_j(i) \geq \text{threshold} \\ 0 & \text{else} \end{cases} \quad (6)$$

where j is the index of source voice font, N is the number of source voice fonts, $w_j^s$ is the spectrum weight for j-th voice font, and $uv_j(i)$ is the V/UV probability for the i-th phoneme predicted by j-th V/UV decision prediction model.

The f0 interpolation operation 214d interpolates the final f0 value for each frame of the phoneme sequence by summing the weighted predicted f0 values from the source voice fonts. In other words, the f0 interpolation operation sums the product of the f0 values predicted by each source voice font f0 prediction model and the f0 weighting factor assigned to the source voice font. Mathematically, the interpolated f0 of f-th frame is expressed as:

$$f0(f) = \sum_{j=1}^{N} w_j^f f0_j(f) \quad (7)$$

where j is the index of source voice font, N is the number of source voice fonts, $w_j^d$ is the f0 weight for j-th voice font, and $f0_j(f)$ is the f0 of the f-th frame predicted by j-th f0 prediction model.

An f0 normalization operation 216 normalizes the interpolated f0 values for the phoneme sequence. In order to normalize the interpolated f0 values, the upper and lower limits of the target f0 range and the interpolated f0 range are interpolated using weighted estimates of upper and lower limits for the f0 range for each source voice font. In various embodiments, the f0 normalization operation includes an f0 range limit estimation operation 216a that estimates the upper and lower limits of the target f0 range based on the values of the predicted f0 ranges. For example, the estimated upper and lower limits of the final f0 range may be calculated as the average upper and lower limits of the f0 ranges predicted for each of the source voice fonts.

A target f0 limit interpolation operation 216b interpolates the upper and lower limits of the target f0 range using the spectrum weight. An interpolated f0 limit interpolation operation 216c interpolates the upper and lower limits of the interpolated f0 range are interpolated using the f0 weight. The upper limit $f0^u$ and the lower limit $f0^b$ of the target f0 range and the upper limit $f0^{u'}$ and the lower limit $f0^{b'}$ of the interpolated f0 range are mathematically expressed as:

$$f0^u = \sum_{j=1}^{N} w_j^s f0_j^u \quad (8)$$

$$f0^b = \sum_{j=1}^{N} w_j^s f0_j^b \quad (9)$$

$$f0^{u'} = \sum_{j=1}^{N} w_j^f f0_j^u \quad (10)$$

$$f0^{b'} = \sum_{j=1}^{N} w_j^f f0_j^b \quad (11)$$

where j is the index of source voice font, N is the number of source voice fonts, $w_j^s$ is the spectrum weight for j-th voice font, $w_j^d$ is the f0 weight for j-th voice font where $f0_j^u$ and $f0_j^b$ are the estimated upper and lower limits for j-th font that have been determined in advance. Finally, a normalized value calculation operation 216d calculates and normalizes the interpolated f0 values using the two pairs of upper and lower limits for the f0 range. The function for the normalized fundamental frequency F0 is mathematically expressed as:

$$F0(f) = \frac{f0(f) - f0^{b'}}{f0^{u'} - f0^{b'}} \times (f0^u - f0^b) + f0^b \quad (12)$$

The interpolated duration values, the interpolated spectral trajectory values, the interpolated V/UV decisions, and the normalized interpolated F0 values are used in a speech synthesis operation 218 that generates a signal usable by an audio output transducer to produce speech using the resulting multi-voice font having the selected speaker and/or prosody characteristics. A multi-voice font storage operation 220 saves the resulting multi-voice font for reuse.

Figure 3:
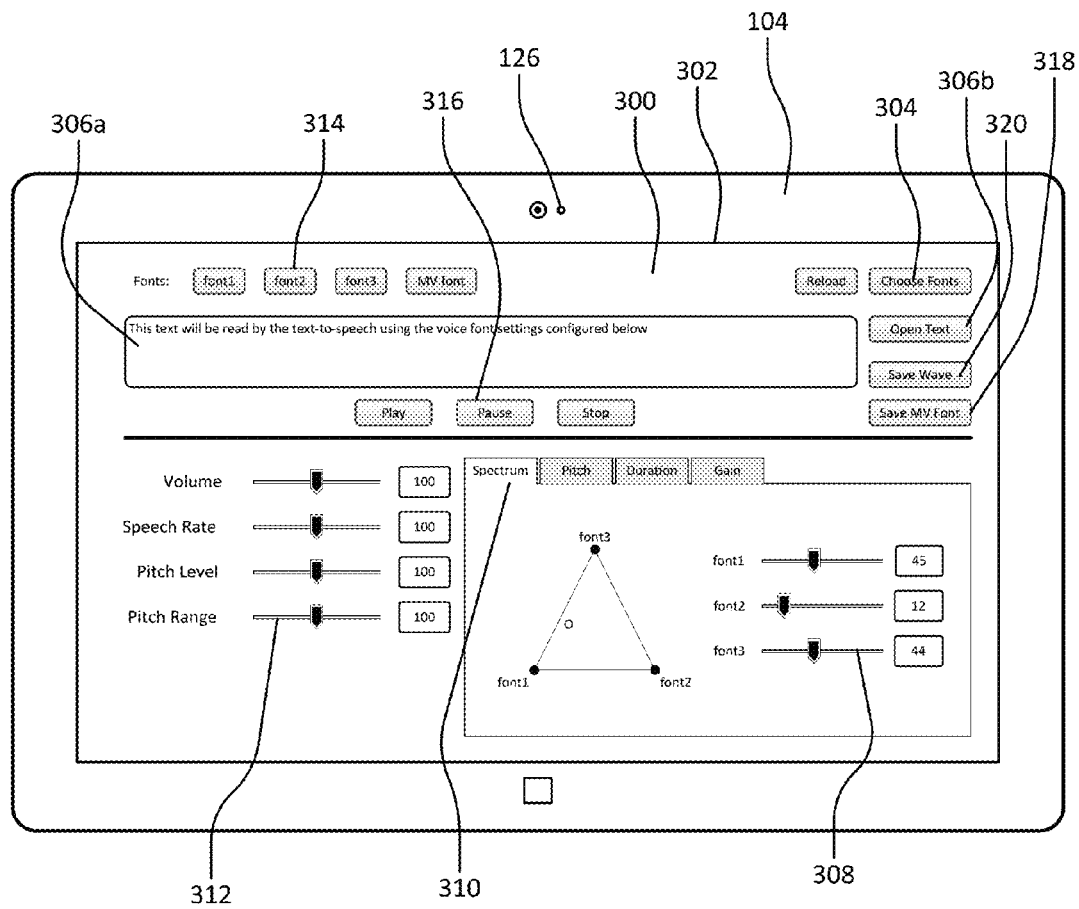
FIG. 3 is one embodiment of a tuning tool providing a user interface for the multi-voice font interpolation engine operating on a client device.

FIG. 3 is one embodiment of a tuning tool providing a user interface for the multi-voice font interpolation engine operating on a client device. In the illustrated embodiment, the user interface 300 is displayed on the display screen 302 of the client device 104, which is represented by a tablet or other hand held computing device. A source voice font selection control (e.g., button) 304 allows selected source voice fonts to be loaded. One or more text input controls allows the entry of text to be converted to speech using any of the source voice fonts or the multi-voice font derived from the source voice fonts. In various embodiments, the text input controls may include an immediate text input control 306a that allows immediate entry of input text (e.g., a text box) or a saved text input control 306b that allows previously saved text to be loaded for use as the input text.

One or more source voice font weight selection controls (e.g., sliders) 308 allow the relative weights assigned to various characteristics (e.g., duration, spectrum, or f0 weights) of each source voice font to be adjusted for use as described in the interpolation method 200. The various characteristics may be independently adjusted by accessing the corresponding characteristic selection control (e.g., tabs) 310. One or more multi-voice font property controls (e.g. sliders) 312 allow the overall properties (e.g., volume, speech rate, pitch level, or pitch range) to be adjusted.

Rendering font selection controls (e.g., buttons) 314 allows the selection of the voice font used to render the input text as computer-generated speech. Playback controls (e.g., play, pause, and stop buttons) 316 allow the input text to be rendered as computer-generated speech using any of the source voice fonts or the interpolated multi-voice font. The rendered speech may be played via the audio output transducer (i.e., speaker) 128 of the client device.

A font save control (e.g., button) 318 allows the multi-voice font to be saved for reuse. A speech save control (e.g., button) 320 allows the computer-generated speech rendered using the multi-voice font to be saved as an audio file.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
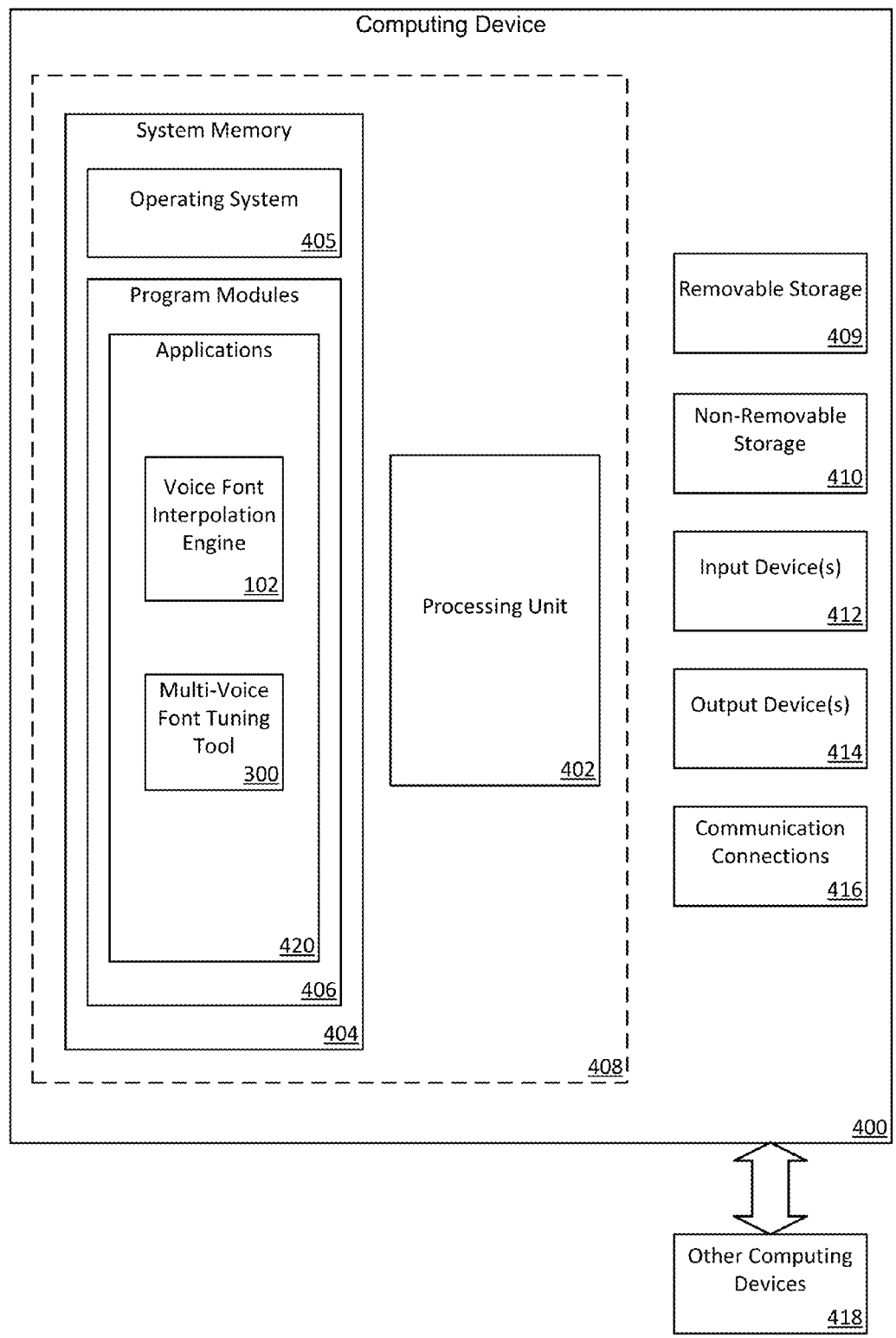
FIG. 4 is a block diagram illustrating one embodiment of the physical components of a computing device with which embodiments of the present invention may be practiced.

FIGS. 4 and 5 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 4 is a block diagram illustrating physical components (i.e., hardware) of a computing device 400 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 420 such as the multi-voice font interpolation engine 102 or the multi-voice font tuning tool 300. For example, the operating system 405 may be suitable for controlling the operation of the computing device 400. Furthermore, embodiments of the invention may be practiced in conjunction with a graphics library, other operating systems, or any other application program and is not limited to any particular application or system. This basic configuration is illustrated by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated by a removable storage device 409 and a non-removable storage device 410.

As stated above, a number of program modules and data files may be stored in the system memory 404. While executing on the processing unit 402, the software applications 420 may perform processes including, but not limited to, one or more of the stages of the interpolation method 200. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 420 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400.

Figure 5A:
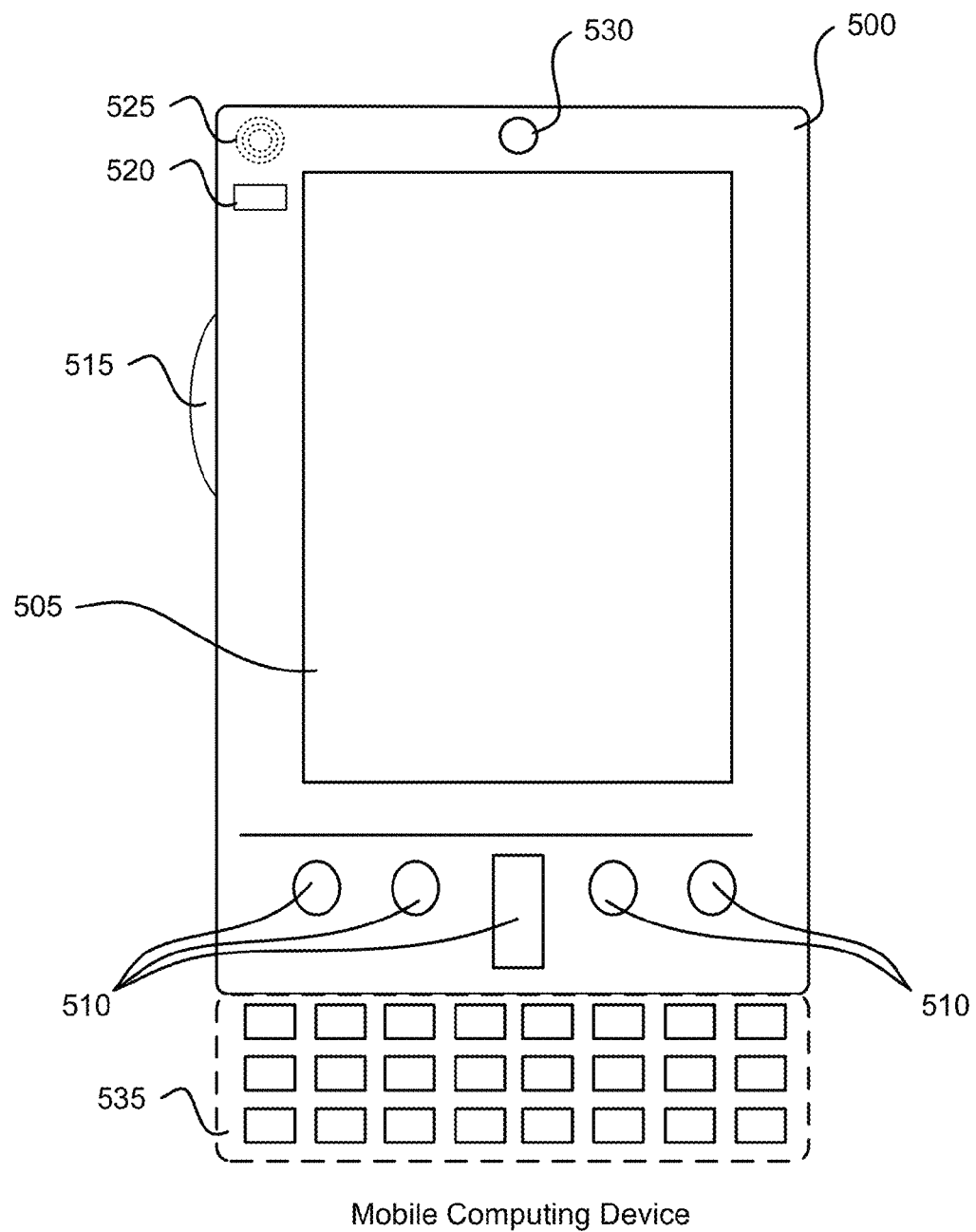
FIGS. 5A and 5B are simplified block diagrams of a mobile computing device with which embodiments of the present invention may be practiced.
Figure 5B:
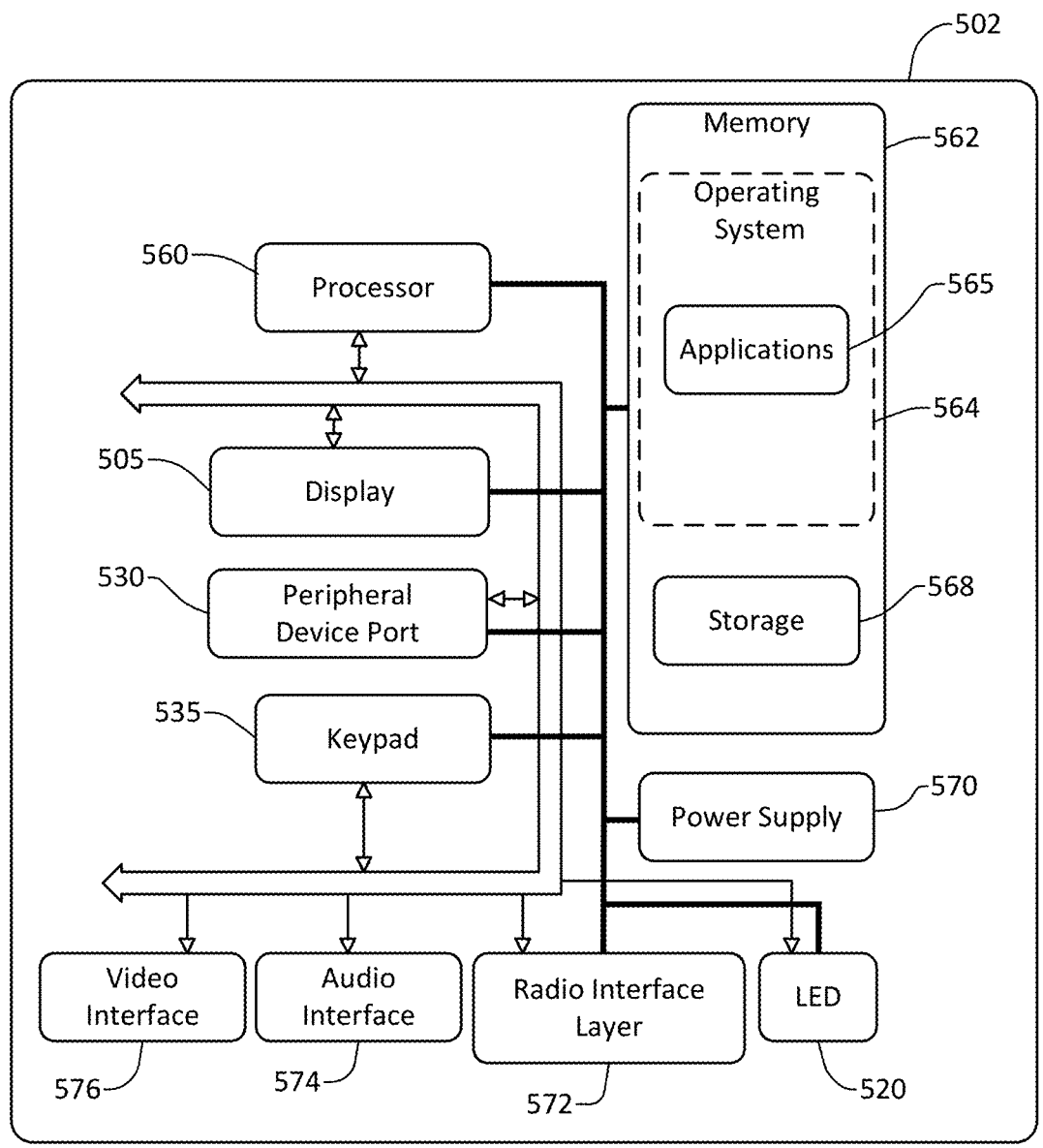

FIGS. 5A and 5B illustrate a mobile computing device 500 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface, a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a smart phone capable of running one or more applications (e.g., browsers, e-mail clients, notes, contact managers, messaging clients, games, and media clients/players). In some embodiments, the system 502 is integrated as a computing device, such as an integrated personal digital assistant (PDA) and wireless phone.

One or more application programs 565 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 565 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including software applications 420 described herein.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the outside world via a communications carrier or service provider. Transmissions to and from the radio 572 are conducted under control of the operating system 564. In other words, communications received by the radio 572 may be disseminated to the application programs 565 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video streams, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
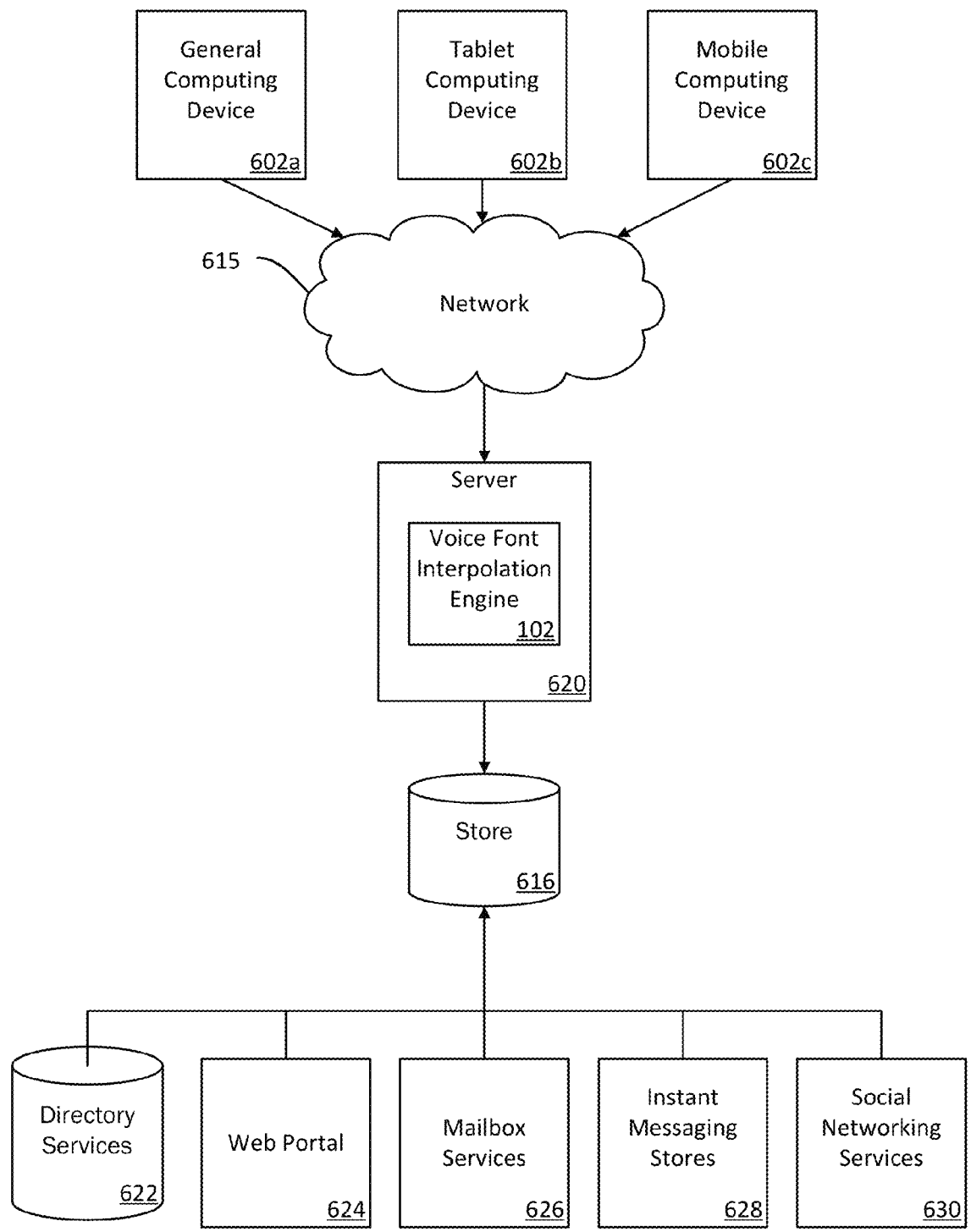
FIG. 6 is a simplified block diagram of a distributed computing system in which embodiments of the present invention may be practiced.

FIG. 6 illustrates one embodiment of the architecture of a system for providing multi-voice font interpolation functionality to one or more client devices, as described above. Content developed, interacted with, or edited in association with the software applications 420 may be stored in different communication channels or other storage types. For example, various documents may be stored using a directory service 622, a web portal 624, a mailbox service 626, an instant messaging store 628, or a social networking site 630. The software applications 420 may use any of these types of systems or the like for enabling data utilization, as described herein. A server 620 may provide the software applications 420 to clients. As one example, the server 620 may be a web server providing the software applications 420 over the web. The server 620 may provide the software applications 420 over the web to clients through a network 615. By way of example, the client computing device may be implemented as the computing device 400 and embodied in a personal computer 602a, a tablet computer 602b, and/or a mobile computing device (e.g., a smart phone) 602c. Any of these embodiments of the client device may obtain content from the store 616.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method allowing computer-generated speech to be rendered with a multi-voice font that is different than source voice fonts used to generate the multi-voice font, the method comprising the acts of:
    loading the source voice fonts;
    assigning weights to characteristics of each source voice font;
    obtaining text to be rendered as the computer-generated speech;
    predicting characteristic values for the text for each source voice font using at least one characteristic prediction model associated with each source voice font;
    merging the predicted characteristic values with the corresponding weights to produce interpolated characteristic values; and
    rendering the text as computer-generated speech having the interpolated characteristic values.

2. The method of claim 1 wherein the act of merging the predicted characteristic values with the corresponding weights further comprises the acts of:
    multiplying the predicted characteristic values by the weight for the characteristic given to the source voice font used to predict the predicted characteristic values; and
    summing the weighted characteristic values to produce the interpolated characteristic values.

3. The method of claim 1 wherein the act of assigning weights to characteristics of each source voice font further comprises the acts of:
    assigning a duration weight to each source voice font;
    assigning a f0 weight to each source voice font; and
    assigning a spectrum weight to each source voice font.

4. The method of claim 3 wherein the act of predicting characteristic values for the text using each source voice font further comprises the act of predicting duration values, voiced/unvoiced probability values, f0 values, and spectral trajectory values for the text using each source voice font.

5. The method of claim 3 wherein the act of obtaining text to be rendered as the computer-generated speech further comprises the act of parsing the text into a sequence of phonemes dividable into frames.

6. The method of claim 5 wherein the act of predicting characteristic values for the text using each source voice font further comprises the acts of:
    predicting a duration value and a voiced/unvoiced probability value for each phoneme using each source voice font; and
    predicting a f0 value and a spectral trajectory value for each frame of each phoneme using each source voice font.

7. The method of claim 5 wherein the act of merging the predicted characteristic values with the corresponding weights further comprises the acts of:
    interpolating a duration value for each phoneme using the duration weights;
    interpolating an voiced/unvoiced probability value for each phoneme using the spectrum weights;
    making a voiced/unvoiced decision for each phoneme based on the voiced/unvoiced probability value for that phoneme;
    interpolating a f0 value for each phoneme using the f0 weight;
    normalizing the f0 values; and
    interpolating a spectral trajectory value for each phoneme using the spectrum weights.

8. The method of claim 7 wherein:
    the act of interpolating a duration value for each phoneme using the duration weights further comprises the acts of:
        multiplying the predicted duration values predicted using each source voice font by the corresponding duration weight to produce weighted duration values; and
        summing the weighted duration values from each source voice font for each phoneme to produce an interpolated duration value for that phoneme;
    the act of interpolating a voiced/unvoiced probability value for each phoneme using the spectrum weights further comprises the acts of:

multiplying the predicted voiced/unvoiced probability values predicted using each source voice font by the corresponding spectrum weight to produce weighted voiced/unvoiced probability values; and summing the weighted voiced/unvoiced probability values from each source voice font for each phoneme to produce an interpolated voiced/unvoiced probability value for that phoneme;

the act of interpolating a f0 value for each phoneme using the f0 weights further comprises the acts of:

multiplying the predicted f0 values predicted using each source voice font by the corresponding f0 weight to produce weighted f0 values; and summing the corresponding weighted f0 values from each source voice font for each frame to produce an interpolated f0 value for that frame; and the act of interpolating spectral trajectory value for each phoneme using the spectrum weights further comprises the acts of:

multiplying the predicted spectral trajectory values predicted using each source voice font by the corresponding spectrum weight to produce weighted spectral trajectory values; and summing the corresponding weighted spectral trajectory values from each source voice font for each frame to produce an interpolated spectral trajectory value for that frame.

9. The method of claim 1 further comprising the act of synthesizing the text as computer-generated speech using the interpolated characteristic values.

10. The method of claim 1 further comprising the act of storing a multi-voice font definition specifying the source voice fonts used to generate the multi-voice font and linking each source voice fonts with the characteristic weights assigned to that source voice font.

11. A system for generating a multi-voice font from a plurality of source voice fonts, the system comprising:

a phoneme sequencer for parsing input text into a sequence of phonemes;

a predictor operable to predict values of voice font characteristics for the phonemes for each source voice font of the plurality of source voice fonts using at least one characteristic model associated with each source voice font;

a weight selector operable to assign a duration weight, a f0 weight, and a spectrum weight to each source voice font, the duration weight, the f0 weight, and the spectrum weight determining the relative contribution of the voice font characteristics predicted for the corresponding source voice font to the multi-voice font;

an interpolator operable to merge the predicted voice font characteristics with the weights to produce the multi-voice font having voice font characteristics derived from the source voice fonts; and a voice encoder operable to render the input text as computer-generated speech using the multi-voice font, the computer-generated speech having the voice font characteristics derived from the source voice fonts.

12. The system of claim 11 wherein the predictor further comprises:

a duration predictor operable to predict duration values for each phoneme using a duration prediction model provided by each source voice font;

a f0 predictor operable to predict f0 values for each phoneme using a f0 prediction model provided by each source voice font;

a spectral trajectory predictor operable to predict spectral trajectory values for each phoneme using a spectrum prediction model provided by each source voice font; and a voiced/unvoiced probability predictor operable to predict voiced/unvoiced probability values for each phoneme using a voiced/unvoiced decision model provided by each source voice font.

13. The system of claim 11 wherein the interpolator further comprises:

a duration interpolator operable to merge the predicted duration values for each phoneme with the duration weight for the predicting source voice font to produce an interpolated duration value for each phoneme;

a f0 interpolator operable to merge the predicted f0 values for each phoneme with the f0 weight for the predicting source voice font to produce an interpolated f0 value for each frame of the phoneme;

a spectral trajectory interpolator operable to merge the predicted spectral trajectory values for each phoneme with the spectrum weight for the predicting source voice font to produce an interpolated spectrum trajectory value for each frame of the phoneme; and a voiced/unvoiced decision interpolator operable to merge the predicted voiced/unvoiced probability values for each phoneme with the spectrum weight for the predicting source voice font to produce an interpolated voiced/unvoiced probability value for each phoneme and compare the interpolated voiced/unvoiced probability value to a threshold to determine an interpolated voiced/unvoiced decision value for each phoneme.

14. The system of claim 11 further comprising a normalizer operable merge the spectrum weight with an estimated f0 upper limit and an estimated f0 lower limit for the predicted f0 range for each frame of each phoneme to produce a first f0 limit pair, merge the f0 weight with an estimated f0 upper limit and an estimated f0 lower limit for the interpolated f0 range for each frame of each phoneme to produce a second f0 limit pair, and normalize the interpolated f0 values using the first f0 limit pair and the second f0 limit pair.

15. A tangible computer storage medium containing computer executable instructions which, when executed by a computer, perform a method of generating a multi-voice font for rendering text as computer-generated speech, the method comprising the acts of:

obtaining the text to be rendered as the computer-generated speech;

loading the source voice fonts;

predicting duration values, voiced/unvoiced probability values, f0 values, and spectral trajectory values for the text for each source voice font using at least one characteristic prediction model associated with each source voice font;

assigning a duration weight, a f0 weight, a spectrum weight to each source voice font;

merging the duration values predicted with each source voice font with the duration weight to produce interpolated duration values, the duration weight for each source voice font representing the percentage that the source voice font contributes to the interpolated duration values;

merging the f0 values predicted with each source voice font with the f0 weight given to that source voice font to produce interpolated f0 values, the f0 weight for each source voice font representing the percentage that the source voice font contributes to the interpolated f0 values;

merging the voiced/unvoiced decision values and the spectral trajectory values predicted with each source voice font with the spectrum weight given to that source voice font to produce interpolated voiced/unvoiced probability values and interpolated spectral trajectory values, the spectrum weight for each source voice font representing the percentage that the source voice font contributes to the interpolated voiced/unvoiced probability values and interpolated spectral trajectory values; and rendering the text as computer-generated speech having the interpolated duration values, interpolated f0 values, interpolated voiced/unvoiced probability values, and interpolated spectral trajectory values.

16. The tangible computer storage medium of claim 15 wherein the method performed by the computer executable instructions further comprises the act of using the interpolated duration values, the interpolated voiced/unvoiced decision values, the interpolated f0 values, and the interpolated spectral trajectory values to render the text as computer-generated speech.

17. The tangible computer storage medium of claim 15 wherein the method performed by the computer executable instructions further comprises the act of parsing the text into a sequence of phonemes with each phoneme dividable into frames and:

the act of merging the duration values predicted with each source voice font with the duration weight given to that source voice font to produce interpolated duration values further comprises the act of, for each phoneme, summing the products of the duration value predicted by each source voice font and the corresponding duration weight;

the act of merging the f0 values predicted with each source voice font with the f0 weight given to that source voice font to produce interpolated f0 values further comprises the acts of:

for each frame, summing the products of the f0 values predicted by each source voice font and the corresponding f0 weight; and normalizing the interpolated f0 values; and the act of merging the voiced/unvoiced probability values and the spectral trajectory values predicted with each source voice font with the spectrum weight given to that source voice font to produce interpolated voiced/unvoiced probability values and interpolated spectral trajectory values further comprises the acts of:

for each phoneme, summing the products of the voiced/unvoiced probability values predicted by each source voice font and the corresponding spectrum weight;

determining whether each phoneme is voiced using the interpolated voiced/unvoiced probability value for each phoneme; and for each frame, summing the products of the spectral trajectory values predicted by each source voice font and the corresponding spectrum weight.

18. The method of claim 1 wherein the act of assigning weights to characteristics of each source voice font further comprises the act of proportioning the weights for each characteristic such that the sum of the weights for each characteristic is substantially equal to one.

19. The tangible computer storage medium of claim 15 wherein the method performed by the computer executable instructions further comprises the act of synthesizing the text as computer-generated speech using the interpolated characteristic values.

20. The tangible computer storage medium of claim 15 wherein the method performed by the computer executable instructions further comprises the act of storing a multi-voice font definition specifying the source voice fonts used to generate the multi-voice font and linking each source voice fonts with the characteristic weights assigned to that source voice font.

* * * * *